United States Patent
Bissell et al.

(10) Patent No.: US 11,002,492 B2
(45) Date of Patent: May 11, 2021

(54) ENERGY STORAGE SYSTEM

(71) Applicant: Sunamp Limited, Edinburgh (GB)

(72) Inventors: Andrew John Bissell, Edinburgh (GB); Santokh Singh Gataora, Edinburgh (GB)

(73) Assignee: SUNAMP LIMITED, Edingburgh (GB)

(*) Notice: Subject to any disclaimer, the term of this patent is extended or adjusted under 35 U.S.C. 154(b) by 0 days.

(21) Appl. No.: 14/898,780

(22) PCT Filed: Jun. 18, 2014

(86) PCT No.: PCT/GB2014/051868
§ 371 (c)(1),
(2) Date: Dec. 16, 2015

(87) PCT Pub. No.: WO2014/202974
PCT Pub. Date: Dec. 24, 2014

(65) Prior Publication Data
US 2016/0370123 A1    Dec. 22, 2016

(30) Foreign Application Priority Data

Jun. 18, 2013 (GB) ..................................... 1310821

(51) Int. Cl.
*F28D 20/02* (2006.01)
*F28D 21/00* (2006.01)
*F28F 27/02* (2006.01)
(52) U.S. Cl.
CPC ........... *F28D 20/02* (2013.01); *F28D 20/028* (2013.01); *F28D 21/0007* (2013.01); *F28F 27/02* (2013.01); *Y02E 60/14* (2013.01)
(58) Field of Classification Search
CPC .... F28D 20/02; F28D 20/028; F28D 21/0007; F28F 27/02
See application file for complete search history.

(56) References Cited

U.S. PATENT DOCUMENTS

| 4,355,627 A * | 10/1982 | Scarlata ............. F28D 20/0034 126/400 |
| 7,490,373 B1 * | 2/2009 | Zavala-Avelar ........ E03B 1/048 4/616 |

(Continued)

FOREIGN PATENT DOCUMENTS

| CN | 101970948 A | 2/2011 |
| CN | 102077050 A | 5/2011 |

(Continued)

OTHER PUBLICATIONS

Review on thermal energy storage with phase change materials and applications; Atul Sharma a.*, V.V. Tyagi b' C.R. Chen a, D. Buddhi b; Renewable and Sustainable Energy Reviews 13 (2009) 318-345.*

(Continued)

*Primary Examiner* — Gordon A Jones
(74) *Attorney, Agent, or Firm* — E. Eric Mills; Todd A. Serbin; Nexsen Pruet, LLC

(57) ABSTRACT

The present invention provides an energy storage system (10) for a use with a boiler (20). The energy storage system (10) comprises a plurality of thermal energy storage banks (101, 102, 103, 104). Each thermal energy storage bank (101, 102, 103, 104) comprises phase changeable material having a predetermined phase transformation temperature. The energy storage system (10) also includes an extraction device (105; 1 15) configured to recover waste energy from the boiler (20). The extraction device (105, 1 15) is operable to extract waste energy from the boiler (20) and feed that energy to at least one (101) of the thermal energy storage banks (101, 102, 103, 104). A controller (106) is arranged, in use, to activate the extraction device (105, 115) in response to operation of the boiler (20).

14 Claims, 3 Drawing Sheets

(56) References Cited

U.S. PATENT DOCUMENTS

| | | | | |
|---|---|---|---|---|
| 2007/0034704 A1* | 2/2007 | Hu | ............................ | F23C 9/00 237/12.1 |
| 2007/0295826 A1* | 12/2007 | Farrell | ...................... | F24D 3/08 237/19 |
| 2010/0006658 A1* | 1/2010 | Peteri | .................. | F24D 19/1051 236/12.12 |
| 2012/0067047 A1* | 3/2012 | Peterson | ................... | C02F 1/22 60/651 |
| 2012/0279679 A1* | 11/2012 | Soukhojak | ......... | B60H 1/00492 165/10 |
| 2014/0284201 A1* | 9/2014 | Remmert | ................. | B01D 3/06 203/22 |

FOREIGN PATENT DOCUMENTS

| | | | |
|---|---|---|---|
| DE | 102006002727 A1 | 7/2007 | |
| DE | 102008033527 | 1/2010 | |
| DE | 102008033527 A1 | 1/2010 | |
| DE | 102009012318 | 9/2010 | |
| DE | 102009012318 A1 | 9/2010 | |
| DE | 102011007626 | 10/2012 | |
| DE | 102011007626 A1 | 10/2012 | |
| GB | 2459955 | 11/2009 | |
| GB | 2459955 A | 11/2009 | |
| JP | S54123449 U | 8/1979 | |
| JP | 2009052765 A | 3/2009 | |
| JP | 2009074750 A | 4/2009 | |
| JP | 2011521192 A | 7/2011 | |
| JP | 2012057936 A | 3/2012 | |
| WO | 2009138771 A2 | 11/2009 | |
| WO | WO 2013184382 A2 * | 12/2013 | ............... H04Q 9/00 |

OTHER PUBLICATIONS

DE102011007626 machine translation.*

* cited by examiner

ENERGY STORAGE SYSTEM

CROSS REFERENCE TO RELATED APPLICATIONS

This application is a 35 U.S.C. § 371 U.S. national phase entry of International Application No. PCT/GB2014/051868 having an international filing date of Jun. 18, 2014, which claims the benefit of Great Britain Application No. 1310821.2 filed Jun. 18, 2013, each of which is incorporated herein by reference in its entirety.

FIELD OF THE INVENTION

The present invention relates to an energy storage system. More particularly, the present inventing relates to thermal storage systems for use with a boiler, for example a domestic boiler.

BACKGROUND TO THE INVENTION

Storage combination or combi boilers combine central heating and domestic hot water (DHW) in one device.

The storage-type device includes an internal water store, typically having capacity for storage in the region of 42 to 54 litres. This corresponds to an average energy storage capacity of approximately 2.70 kWh per charge of the device. Examples of such storage combination boilers are listed in the following table together with their main characteristics:

TABLE 1

Storage combination boilers

| Make & model | Height [mm] | Width [mm] | Depth [mm] | Thermal rating HW Mode [kW] | Thermal rating CH Mode [kW] | Store Capacity [L] | HW flow Rate [L/min] | Energy Storage [kWh] |
|---|---|---|---|---|---|---|---|---|
| Alpha NEW In Tec 50CS FS | 850 | 650 | 600 | 32.0 | 28.0 | 53.6 | 14.4 | 3.08 |
| Alpha CD50 WM | 900 | 600 | 450 | 32.0 | 29.7 | 52.0 | 14.0 | 2.99 |
| Glowworm Ultracom 2 - 35 | 990 | 470 | 570 | 35.7 | 30.0 | 42.0 | 14.5 | 2.42 |
| Vaillant ecoTEC plus | 720 | 440 | 597 | 37.0 | 28.0 | 42.0 | 15.2 | 2.42 |
| Viessmann Vitidens 111-W (26 kW) | 900 | 600 | 480 | 29.3 | 23.7 | 46.0 | 17.5 | 2.65 |
| Viessmann Vitidens 111-W (35 kW) | 900 | 600 | 480 | 35.0 | 31.7 | 46.0 | 17.5 | 2.65 |
| Average | 877 | 560 | 530 | 33.5 | 28.5 | 46.9 | 15.5 | 2.70 |

The hot water flow rate defined in the above table is based on a temperature increase of 35 degrees Kelvin, i.e. nominal hot water flow temperature of 45 degrees centigrade.

Flow rates from such devices range from 14.0 to 17.5 litres per minute.

Hot water storage within such combination boiler devices is used primarily to increase efficiency of the device, in use, and to improve customer satisfaction when using a combination boiler. This is achieved because energy wastage is reduced by reducing boiler cycling, switching on at high power even for small draw offs. Water and energy wastage is reduced because hot water is supplied instantly from the hot water store compared with a delay of approximately 15 seconds for a conventional combination boiler to produce water at a usable temperature above 40 degrees centigrade. A conventional combination boiler does not include water storage facility, but instead heats water as it flows through the boiler. In some cases a conventional combination boiler includes a keep hot facility to provide instant hot water, but this feature is known to waste up to 900 kWh of heat energy per year.

Combination boilers have many moving parts that can lead to break down, and so can be considered less reliable than boilers such as system boilers, heat only boilers etc. which are generally associated with a storage tank.

It is desirable to provide an improved boiler based heating system.

It is further desirable to provide an improved energy storage system that provides an improved alternative to a conventional storage means for boiler use.

SUMMARY OF THE INVENTION

A first aspect of the present invention provides an energy storage system for a use with a boiler, the energy storage system comprising:
a plurality of thermal energy storage banks, wherein each thermal energy storage bank comprises a phase changeable material having a predetermined phase transformation temperature;
an extraction device configured to recover waste energy from the boiler, wherein the extraction device is operable to extract waste energy from the boiler and feed that energy to at least one of the thermal energy storage banks; and
a controller arranged, in use, to activate the extraction device in response to operation of the boiler.

The system according to embodiments of the present invention can store energy for heating a relatively small volume of water using phase change material having a suitable phase change transformation temperature.

The phase change transformation temperature may be the same for all banks. Alternatively, at least one bank may operate with a phase change transformation temperature lower than the phase transformation temperature of the remaining banks.

Each thermal energy storage bank may be connected to one or more adjacent thermal energy storage banks by thermal energy transfer connections.

The extraction device may comprise a pump. The pump may comprise a potable water mini pump. Alternatively, the pump may comprise a micro heat pump.

The pump may be configured to recover waste heat from flue gases generated during boiler operation. The controller may activate the pump in response to firing of the boiler, for example upon demand for hot water.

The energy storage system may recover heat from the boiler, in particular from boiler inefficiencies, such as waste heat from exhausted flue gases and from the boiler heat exchanger assembly during the boiler pump overrun period at the end of a firing cycle. The present invention provides means for efficient flue gas recovery and end of firing cycle recovery that can be integrated with hot water storage. Therefore, a device according to embodiments of the present invention will increase energy recovery compared with currently available technology.

The system may comprise a cold water inlet. Cold water may be mains fed.

The system may comprise a thermostatic blending valve, wherein the blending valve may combine mains fed cold water with water heated by the energy storage system to control outlet temperature of potable hot water. The thermostatic valve may be configured to regulate outlet water temperature in the region of 47 degrees centigrade.

The flow rate of the energy storage device according to embodiments of the present invention may be at least 15.5 litres per minute.

The phase change material may comprise a phase transformation temperature in the region of 58 degrees centigrade. The phase change material may comprise a phase transformation temperature within the range of 50 to 55 degree centigrade.

At least one of the banks may comprise phase change material comprising a phase transformation temperature in the region of 28 degrees centigrade. The benefits of using 28° C. low temperature PCM are that heat recovery circuit can be maintained at lower temperature for longer periods and there by increasing the amount of energy recovered.

An energy storage system according to embodiments of the present invention may reduce boiler cycling. It will be appreciated that in a domestic setting the majority of hot water draw-offs, for example hand washing, are of short duration and therefore may present highly inefficient use of energy.

A second aspect of the present invention provides a boiler in combination with the energy storage system according to the first aspect.

A suitable boiler for use with the energy storage system in accordance with the present invention may be a system boiler. Alternatively, a suitable boiler for use with the energy storage system may be a combination boiler, wherein the energy storage system according to the first aspect is provided external to the boiler. A suitable boiler may be, for example, but not limited to a gas-fired boiler or a gas-fired boiler.

The combination of a suitable boiler and an external energy storage system according to the present invention may provide a comparable system to a storage combination boiler, but with savings in development and certification costs.

An energy storage system used in combination with a system boiler is advantageous over known system boilers because a storage cylinder, generally situated in an airing cupboard or the like, is no longer required. As such the space required for water storage is reduced.

An energy storage system used externally in combination with a combination boiler is advantageous over known conventional combination boilers because the external energy storage system substantially eliminates a delay in producing hot water upon demand. In addition an energy storage system used externally in combination with a combination boiler reduces the storage vessel requirements and also reduces the number of operational parts within the boiler device that can lead to break downs.

The potable water content of the energy storage system will be significantly less than 15 litres. As such, the device may not require safety devices and testing normally associated with unvented storage vessels (40-80 litre) used in combination boilers.

Conventional storage combination boilers, generally require the stored potable water to be pasteurised because of the volume of water stored within the vessel exceeds a predetermined level which increases the stagnation time. As such, by reducing and maintaining the volume of potable water in the system to a maximum level of around 10 litres and heating it instantaneously on demand, the water should not require pasteurisation, such as heating to above 60 degrees centigrade, to protect against legionella.

A system boiler together with the energy storage system provides improved boiler efficiency compared with conventional system boiler arrangements and with storage combination boilers. Average boiler circuit temperatures will generally be lower.

The combination of a system boiler and the energy storage system according to the present invention reduces water and energy wastage because instant hot water can be provided from the store provide by the energy storage system.

BRIEF DESCRIPTION OF THE DRAWINGS

Embodiments of the present invention are described below, by way of example only, with reference to the accompanying drawings, in which.

BRIEF DESCRIPTION

Figure 1:
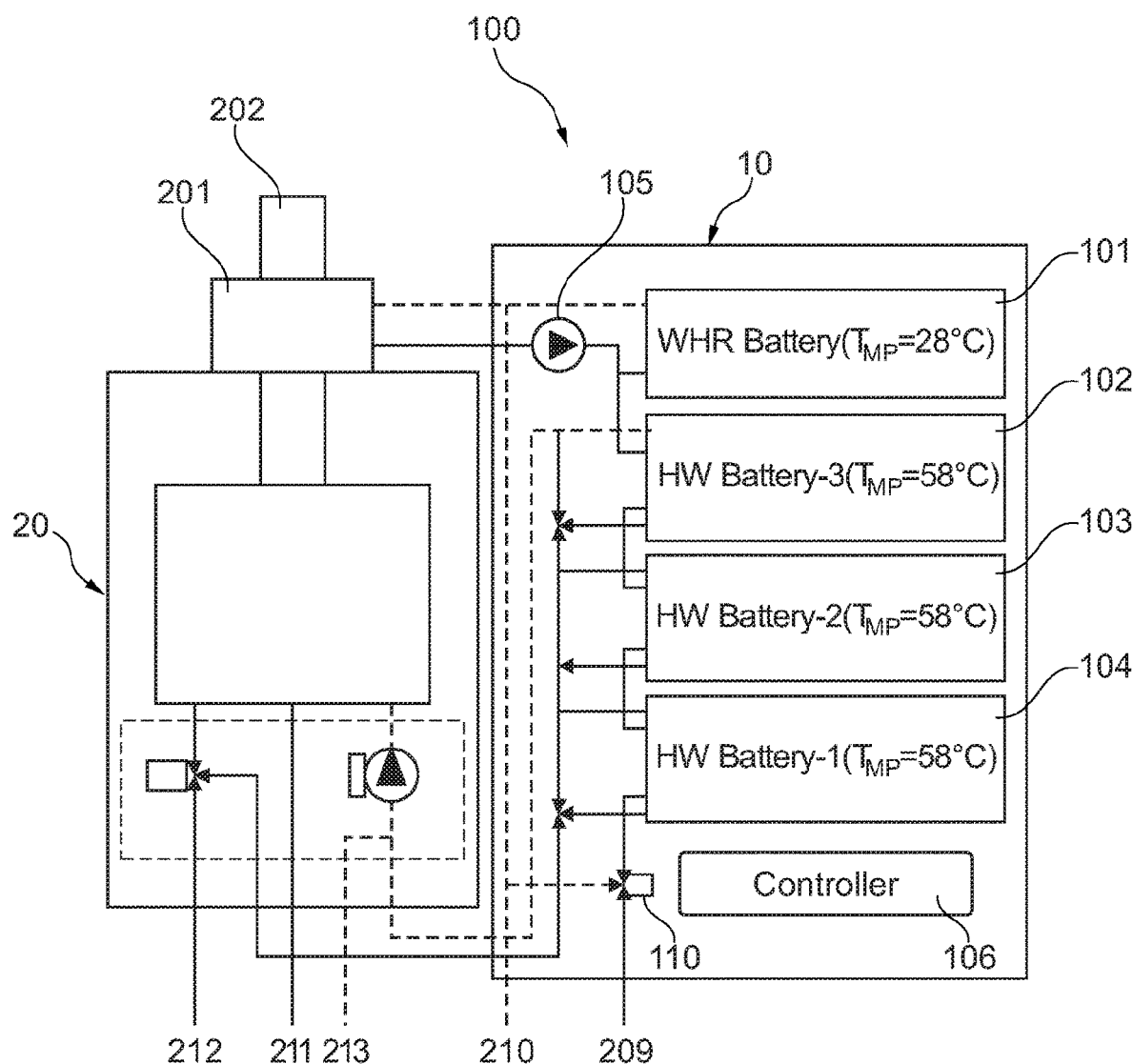
FIG. 1 illustrates a schematic representation of a storage boiler arrangement comprising an energy storage system according to an embodiment of the present invention.

FIG. 1 is a representation of an energy storage system 10 according to an embodiment of the present invention in combination with a system boiler 20 to provide, what can be considered effectively a combination boiler 100 with external storage capacity.

The energy storage system 10 comprises a series or collection of banks, 101, 102, 103, 104, which are used to collect and store thermal energy which is normally dissipated as flue gas waste. The energy storage system 10 recovers heat from a heat exchanger 201 located between the boiler 20 and the flue 202.

Each bank 101, 102, 103, 104 contains phase change material. The first bank is the waste heat recovery battery and contains a phase change material with a melting point at 28 degrees centigrade and storage capacity in the region of 1.5 kWh.

The other banks 102, 103, 104 each contain a phase change material with a melting point of 58 degrees centigrade and storage capacity of 2.0 to 10.0 kWh.

Figure 2:
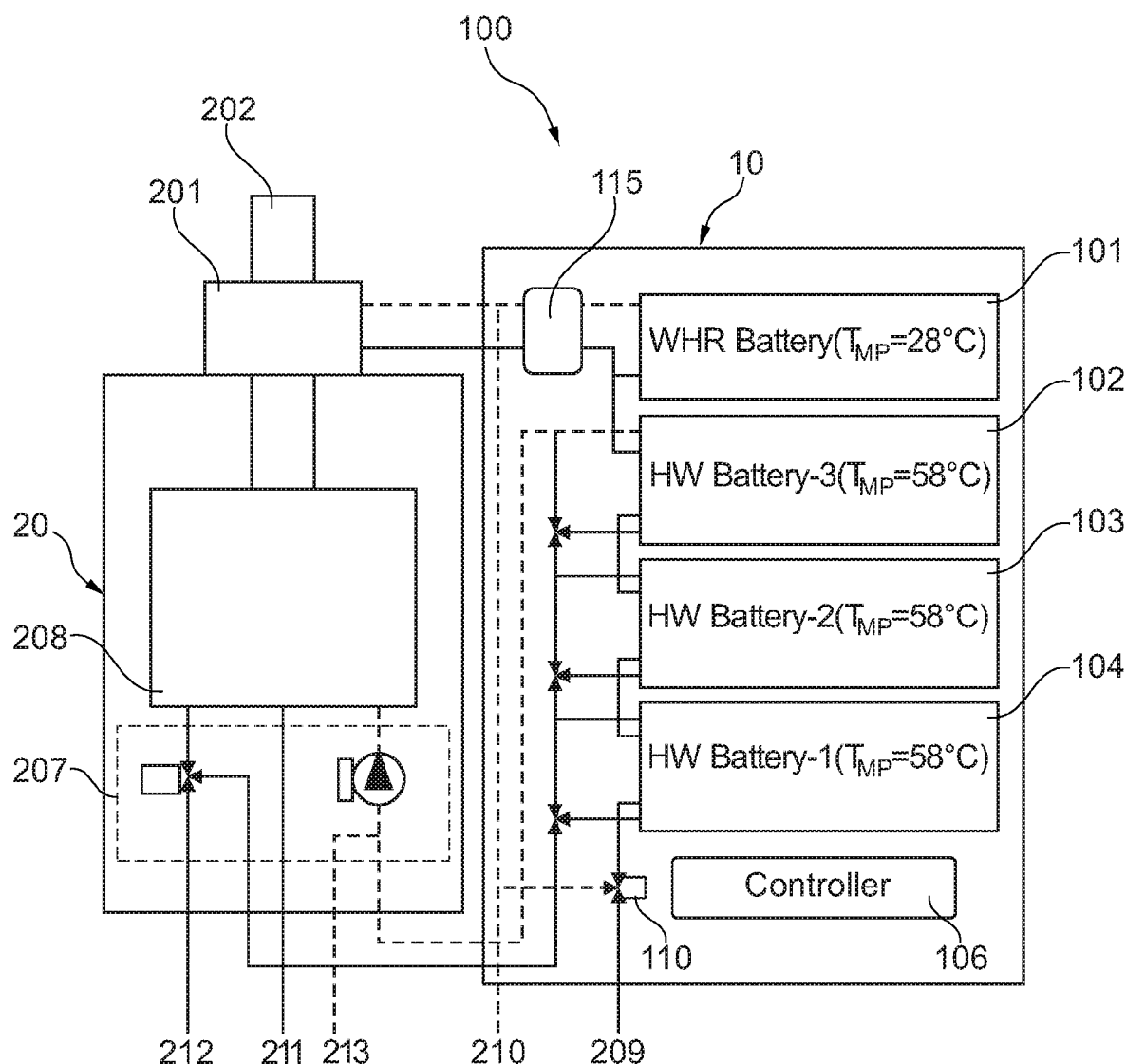
FIG. 2 illustrates a schematic representation of a storage boiler arrangement comprising an energy storage system according to an embodiment of the present invention.

In the embodiment illustrated in FIG. 1, a pump 105 is provided to transfer waste heat energy from a flue gas heat exchanger 201 to the waste heat recovery bank 101. A controller 106 is operable to activate the pump 105 when the boiler 20 is fired upon demand for hot water, for example a tap is opened. Heat energy from the exhaust/flue gases are therefore recoverable FIG. 2 is a representation of an arrangement of a boiler 20 and energy storage system 10 similar to the arrangement illustrated in FIG. 1. As such, like reference numerals have been applied. The difference between the arrangements illustrated in FIG. 1 and FIG. 2 is a micro heat pump 115 in the waste heat recovery circuit between the flue gas heat exchanger 201 and the waste heat recovery bank 101 as illustrated in FIG. 2. A water to water micro heat pump 115 will generally extract more energy from the boiler flue gases 202 than the potable water mini pump 105 illustrated in FIG. 1. In addition the micro pump 115 is capable of storing the extracted heat energy at a higher temperature than the mini pump 105 of FIG. 1.

In the illustrated examples, the boiler 20 is a conventional system boiler, which in combination with the energy storage system 10 dispenses with a hot water storage tank.

The combination of a system boiler 20 and the energy storage system 10 provides a heating system that can operate more efficiently than a comparable storage combination boiler.

The boiler 20 is a typical system boiler, which does not form part of the present invention as such. The main components of the boiler 20 associated with the energy storage system are described below. It will be appreciated that other boiler types can be used with the system according to embodiments of the present invention, including for example a gas-fired boiler or an oil-fired boiler.

In both FIGS. 1 and 2, the boiler 20 comprises a hydro-block 207. Upon opening a hot-water tap the boiler 20 generally responds to the demand and the boiler fires-up and hot water is supplied to the tap via a three port valve located on the hydro-block 207. In the illustrated example the output flow at the hydro-block 207 is directed through the energy storage system 10. Therefore, the demand on the boiler 20 is reduced due to the heat from the flue gases 201 being recovered and used by the energy storage system 10 to heat water that is stored in the energy storage system 10. As such, upon demand for hot water, the system according to embodiments of the present invention supplies hot water immediately the tap is opened.

The hot exhaust/flue gases are generally exhausted to the atmosphere via the boiler flue 202 after the heat has been extracted by the boiler gas to water heat exchanger from the combustion of gases within the combustion chamber 208. In the illustrated example a heat exchanger 201 is located between the combustion chamber 208 and the boiler flue 202 and act together with the energy storage system 10 to recover heat from the exhaust gases, as described further below.

Flue gases are generally corrosive especially below the dew point and therefore a stainless steel bespoke gas to water heat exchanger 201 for the waste heat recovery circuit may be most suitable. To keep the development simple, flexible and cost effective a pumped circuit is used to transfer heat from the heat exchanger 201 to the waste heat recovery bank 101.

The system 100, comprising a boiler 20 and an energy storage system 10 includes a hot water outlet 209, mains cold water supply 210, a condensate drain 211, central heating hot water flow output 212, and central heating return 213.

In the system according to embodiments of the present invention, the potable water content in the energy storage system 10 will be less than 15 litres. Therefore, the water content should not require pasteurisation i.e. heating above 60 degrees centigrade, to protect against legionella. However, if pasteurisation of potable, domestic, hot water is a requirement, for example as set by a regulations, bank 101, as illustrated in FIG. 1 can be heated to an elevated temperature periodically, for example once per week.

In known storage combination boilers the water is normally heated to around 65 degrees centigrade to increase storage capacity and to reduce the risk of legionella. The average energy storage capacity of a vessel of a storage combination boiler is 2.7 kWh, which corresponds to around 25 litres of potable water. Typically, such volume requires pasteurisation of the water and therefore requires heating in excess of 60 degrees centigrade.

During normal operation of a boiler 20, at the end of the heating cycle, the boiler pump generally continues to run for a further five to ten minutes to prevent overheating of the boiler. The energy in the boiler, due to the overrun, is normally dissipated to central heating radiators or through the casing of the boiler appliance. In the configuration of a boiler 20 and energy storage system 10 according to embodiments of the present invention, the energy storage system 10 can utilise the overrun period of the boiler 20 by recovering this energy during the overrun period because stratification in the banks 101, 102, 103, 104 can be managed.

Figure 3:
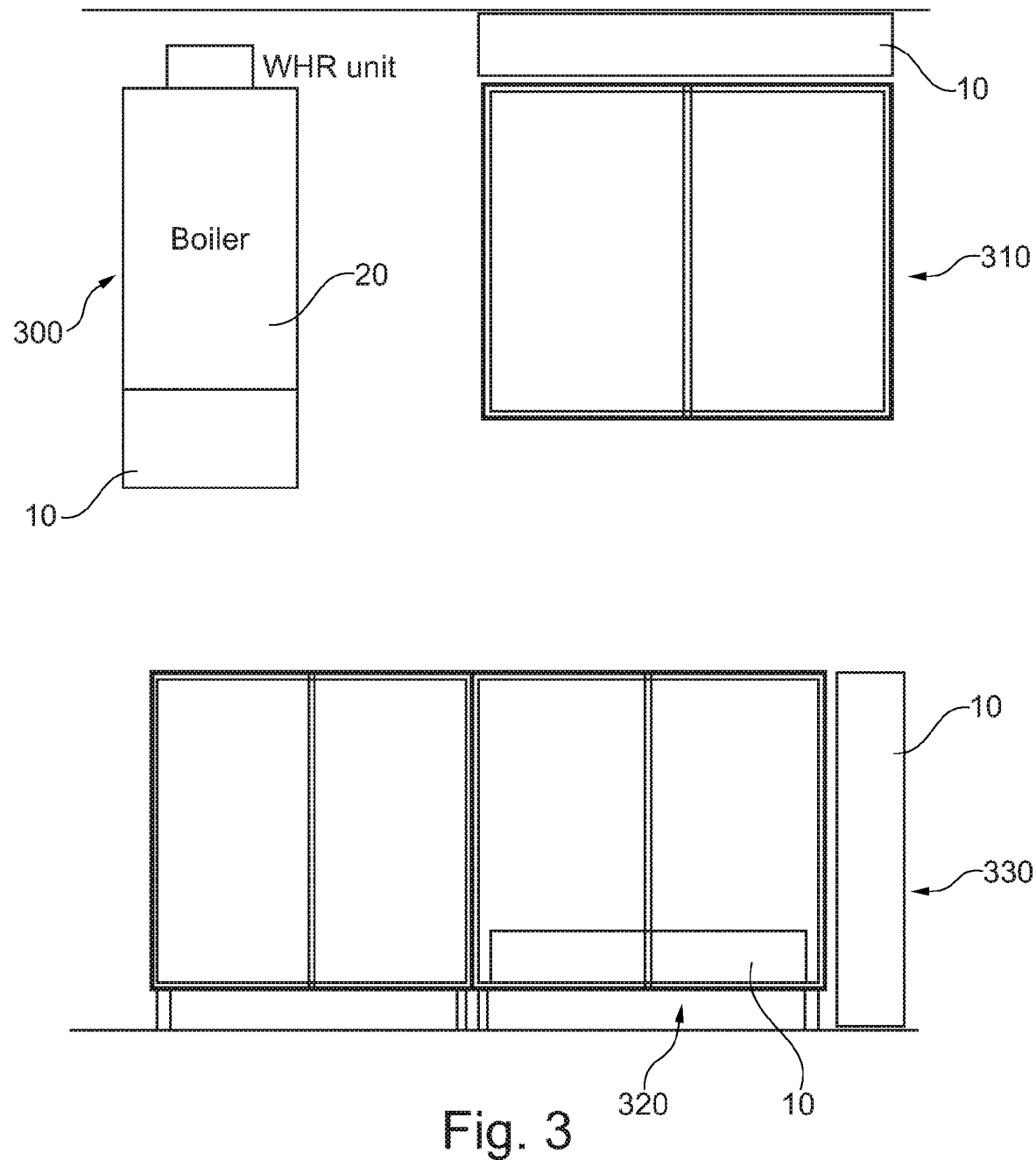
FIG. 3 illustrates a schematic representation of suitable locations for an energy storage system according to embodiments of the present invention.

The flow temperature from a comparative combination boiler is in the region of 45 degrees. To achieve the same flow temperature from the boiler 20 and the energy storage system 10 as illustrated in FIGS. 1 and 2 suitable phase change material is material comprising a melting point or phase transformation temperature of 50 to 55 degrees centigrade. In addition a thermostatic blending valve 110 is included in the energy storage system 10 such that the temperature of hot water at the outlet 209 is regulated at around 47 degrees centigrade The energy storage system is configurable such that the space it requires for mounting/locating is minimised. For example, as illustrated in FIG. 3, the energy storage system 10 may be located adjacent the boiler 20, for example behind or below 300 the boiler 20. Alternatively, the energy storage system 10 may be located remotely from the boiler 20, with suitable conduit or pipework connecting the two. For example, a boiler 20 may be mounted in a wall or within a cabinet in a kitchen and the energy storage system 10 may be located discretely in a space or void, for example above wall cabinets 310, in a cavity behind base cabinets 320 or in a space between a cabinet and a wall 330.

In the embodiments described and illustrated the energy storage system 10 comprises four banks 101, 102, 103, 104. However, it will be appreciated that the number of banks/batteries are provided by way of example only, as is the melting point temperatures of the phase change material in each bank. As such fewer or more banks may be applicable and also higher or lower phase transformation temperatures may apply.

The system comprising phase change material provides a system capable of storing and releasing energy, where heat is absorbed or released when the physical state of the material changes from solid to liquid or liquid to solid.

The system has been described in combination with a system boiler. However, it will be appreciated that the system can be used with other types of boiler to improve system performance and reduce waste heat, for example, but not limited to oil-fired boilers and gas-fired boilers.

Whilst specific embodiments of the present invention have been described above, it will be appreciated that departures from the described embodiments may still fall within the scope of the present invention.

The invention claimed is:

1. A combination boiler comprising:
a boiler; and
an energy storage system comprising:
a mains-fed, cold water supply for inputting cold water into the energy storage system;
a plurality of individual thermal energy storage banks in fluid communication with the mains-fed, cold water supply, wherein each of the plurality of individual thermal energy storage banks comprise a phase changeable material having a predetermined phase transformation temperature;
an extraction device configured to recover waste energy from the boiler, wherein the extraction device is operable to extract waste energy from the boiler and feed that energy to at least one of the thermal energy storage banks;
a hot water outlet disposed downstream from the plurality of individual thermal energy storage banks for discharging hot water from the energy storage system; and
a controller configured to activate the combination boiler in response to operation of the boiler and to manage the stratification in the thermal energy storage banks to recover energy during an overrun period,
wherein the combination boiler has a maximum volume of 10 litres of potable water,
wherein contact of the potable water with one or more of the individual thermal energy storage banks instantaneously heats the water on demand, and
wherein the potable water is unpasteurized.

2. The combination boiler of claim 1, wherein each individual thermal energy storage bank has the same predetermined phase-change transformation temperature.

3. The combination boiler of claim 1, wherein at least one of the individual thermal energy storage banks of the plurality of individual energy storage banks has a phase-change transformation temperature lower than the predetermined phase transformation temperature of the other individual thermal energy storage banks of the plurality of individual energy storage banks.

4. The combination boiler of claim 1, wherein each individual thermal energy storage bank of the plurality of individual energy storage banks is connected by thermal energy transfer connections to an adjacently positioned individual thermal energy storage bank; and
wherein the extraction device comprises a pump.

5. The combination boiler of claim 4,
wherein the pump comprises a potable water mini pump or a micro heat pump,
wherein the pump is configured to recover waste heat from flue gases generated during boiler operation; and
wherein the controller activates the pump in response to firing of the boiler.

6. The combination boiler of claim 1,
wherein the potable water enters the plurality of individual thermal energy storage banks and exits the plurality of individual thermal energy storage banks directly to the hot water outlet.

7. The combination boiler of claim 6, further comprising:
a thermostatic blending valve that blends inlet cold water with the potable water heated by the energy storage system to control outlet water temperature of the potable hot water;
wherein the thermostatic valve regulates the outlet water temperature, and
wherein the outlet water temperature is in the region of 47 degrees centigrade.

8. The combination boiler of claim 1, wherein a flow rate of the energy storage system is at least 15.5 litres per minute.

9. The combination boiler of claim 1, wherein the phase-changeable material comprises a phase transformation temperature in the region of 58 degrees centigrade.

10. The combination boiler of claim 1, wherein the phase-changeable material comprises a phase transformation temperature within the range of 50 to 55 degree centigrade;
wherein at least one of the individual thermal energy storage banks comprises phase change material comprising a phase transformation temperature in the region of 28 degrees centigrade.

11. The combination boiler according to claim 1, wherein the boiler is a system boiler, gas-fired boiler, or an oil-fired boiler.

12. The combination boiler according to claim 1, wherein the energy storage system is located externally to and in fluid communication with the boiler.

13. The combination boiler according to claim 12, wherein the energy storage system comprises a heat exchanger that receives exhaust gases and delivers captured heat energy to at least one of the individual thermal energy storage banks.

14. The combination boiler of claim 1, wherein the energy storage system is an open system.

* * * * *